(12) United States Patent
Thies

(10) Patent No.: US 7,803,220 B2
(45) Date of Patent: Sep. 28, 2010

(54) COLOR LEAD FOR A WRITING DEVICE, DRAWING DEVICE OR PAINTING DEVICE

(75) Inventor: Andreas Thies, Effeltrich (DE)

(73) Assignee: J.S. Staedtler GmbH & Co. KG, Nuremberg (DE)

( * ) Notice: Subject to any disclaimer, the term of this patent is extended or adjusted under 35 U.S.C. 154(b) by 562 days.

(21) Appl. No.: 11/706,122

(22) Filed: Feb. 14, 2007

(65) Prior Publication Data
US 2007/0289482 A1 Dec. 20, 2007

(30) Foreign Application Priority Data
Feb. 27, 2006 (DE) ........................ 10 2006 010 119

(51) Int. Cl.
*C09D 13/00* (2006.01)
(52) U.S. Cl. .................................. 106/31.11
(58) Field of Classification Search ................ 106/31.11
See application file for complete search history.

(56) References Cited

U.S. PATENT DOCUMENTS 6,395,076 B1 * 5/2002 Hashimoto ............... 106/31.11
6,875,261 B2 * 4/2005 Hashimoto et al. ....... 106/31.11
2002/0139278 A1 10/2002 Hashimoto

FOREIGN PATENT DOCUMENTS

DE 42 14 396 11/1992
JP 1 232 099 9/1989
JP 10330679 A * 12/1998

OTHER PUBLICATIONS

English machine translation of JP 10-330679.*

* cited by examiner

*Primary Examiner*—Jerry Lorengo
*Assistant Examiner*—Veronica Faison Gee
(74) *Attorney, Agent, or Firm*—Lucas & Mercanti, LLP

(57) ABSTRACT

An unburnt color lead for writing devices, drawing devices and painting devices, includes at least one coloring material, at least one binder, at least one organic lubricant which is solid at room temperature, and at least one filler material whose particles essentially have a disk-shaped configuration. The color lead contains 20 to 80 weight % of the at least one filler material, and the color lead contains at least 20 weight % hexagonal bornitride as a first filler material.

5 Claims, No Drawings

COLOR LEAD FOR A WRITING DEVICE, DRAWING DEVICE OR PAINTING DEVICE

BACKGROUND OF THE INVENTION

1. Field of the Invention

The present invention relates to an unburnt color lead for writing devices, drawing devices or painting devices.

2. Description of the Related Art

Unburnt color leads for writing, drawing and/or painting are known in the art.

Lines from burnt and unburnt color leads according to the prior art have low to very bad erasing properties. If a line is being removed with a commercially available eraser, it often happens that the paper is strained so heavily that it tears. The bad erasing properties of such lines result from the fact that color pigments together with waxes and soaps penetrate the surface of the application medium or because its open pore conduits are being clogged. Furthermore, it must be regarded as a drawback in such color leads that the gliding properties of these color leads on the application medium are by far worse than what the user is accustomed to from graphite leads of average quality.

Thus, from US 2002/0139278 A1 there is known an unburnt color lead consisting of colorant, dissolvent, filler material, an oil/water emulsion, surface-active substances and mica as gliding or filler material. In such leads it turned out to be disadvantageous that the eraser qualities are present but the substrate is heavily strained for a complete removal of the line since frequent erasing motion over the same area is necessary.

Furthermore, from JP 01232099 there is known a color lead for the overcoating of badly removable or erasable lines, which contains white color medium, lubricant, filler material and further additives.

It has to be considered disadvantageous in such a lead that this applied correction coat is very difficult to erase. The consequence is an unsightly smeared area. In general, erasing of such lines is not intended. Its purpose is a high covering power and not its removability.

SUMMARY OF THE INVENTION

Therefore, it is the primary object of the present invention is to produce a color lead that, similar to a pencil, guarantees a very simple and residue free erasing ability of the line on light as well as on dark backgrounds and that, in addition, has very good gliding properties on the application medium or substrate. Furthermore, it is an object of the invention to obtain for the line a pencil-like graphite gloss, whereby the line should not only cover on light backgrounds but particularly also on dark backgrounds.

Color leads for writing, drawing or painting are understood, on the one hand, as leads that are fixedly enclosed in wood or other sharpenable materials, and, on the other hand, as leads that are movably mounted in a bending-resistant casing. Respective examples are wood-encased color pencils, fine color leads for mechanical pens, so-called automatic pencils, and leads for drop pens or pushing pens.

Herein, the lead profile can be of round, oval, triangular, hexagonal or rectangular shape.

Furthermore, it is completely immaterial for the concept of the invention if it is a full lead, a tube lead or a multi-layer lead.

The object is met in that the unburnt color lead for writing, drawing and painting devices consists of at least one chromophoric or coloring medium, at least one binder, at least one organic lubricant that remains solid at room temperature and of at least one filler material. The particles of the filler material are mainly disk-shaped, wherein the content of the at least one filler material is between 20 to 80 weight %. In addition, the color lead contains at least 20 weight % hexagonal boron nitride as a first filler material.

The lead according to the invention can have a second filler material which is at least one material selected from the group of layer silicates, such as, for example, talc, mica, steatite, muscovite, kaolinite and/or pyrophylite.

Bornitride, also known as "white graphite", has proven to be a preferably used filler material. Bornitride in its hexagonal structure is preferably used as the first filler material. The crystallographic composition of bornitride in the hexagonal structure is practically identical with the composition of graphite.

The various features of novelty which characterize the invention are pointed out with particularity in the claims annexed to and forming a part of the disclosure.

DETAILED DESCRIPTION OF THE PREFERRED EMBODIMENTS

The effect of easy erasability is already apparent at contents of bornitride starting at 30 weight %. The contents of bornitride in the leads according to the invention can be up to 90 weight % without reducing or damaging the color intensity or luminance of the line.

The effect is also reached if the imported bornitride is partially, up to 50%, replaced by macro-crystalline and disk-shaped filler materials from the group of layer silicates.

Because of the graphite-like structure, the line on the paper is applied in a layered manner of the lead material, which greatly reduces the penetration of chromophoric substances in the paper and thus facilitates the removal of the line with an eraser.

Comparing the composition of the lead according to the present invention with a lead according to the prior art, one discovers that the bornitride replaces part of the used filler materials. The inherently known composition of the leads changes only insignificantly in the process.

As binder one can use cellulose derivates, starches and/or polyvinyl alcohol.

The lubricants used can, for example, be chosen from the group of long-chained, saturated and unsaturated fatty acids of the general formula $H_2C-(CH_2)_n-(CH-CH)_m-(CO)_o-COOR$, whereby $R=H$, $R=-CH_3$, $-CH_2CH_3$, ... and/or $R=M^+$, $M^{2+}$, $M^{3+}$ The lubricant can be available as stearic acid and/or a stearate.

As colorant can be used, to name a few examples, organic or inorganic pigments, dyes or lacquered dyes, coated mica as well as coated or uncoated metal bronzes and mixtures of these colorants.

The invention will be illustrated in more detail by way of a frame example as well as several recipe examples.

Frame Example for an Unburnt Color Lead:

| | |
|---|---|
| Colorant | 0.5 to 15 weight % |
| Bornitride | 30 to 90 weight % |
| Lubricant | 4.0 to 25 weight % |
| Binder | 2.0 to 13 weight % |
| Titan dioxide | 0.0 to 15 weight % |
| Fillers | 0.0 to 50 weight % |

Recipe Example 1—Blue Lead

| | |
|---|---|
| Pigment blue 15:3 | 1.5 weight % |
| Bornitride | 39 weight % |
| Titan dioxide | 8 weight % |
| Calcium stearate | 5 weight % |
| Stearate acid | 7 weight % |
| Carboxymethyl cellulose | 5 weight % |
| Mica | 14 weight % |
| Steatite | 20.5 weight % |

Recipe Example 2—Red Lead

| | |
|---|---|
| Pigment red 4 | 2.5 weight % |
| Pigment red 57:1 | 1.0 weight % |
| Bornitride | 78 weight % |
| Calcium stearate | 7 weight % |
| Stearate acid | 7 weight % |
| Carboxymethyl cellulose | 2.5 weight % |
| Titan dioxide | 2.0 weight % |

Recipe Example 3—Purple Lead

| | |
|---|---|
| Pigment purple 27 | 1.5 weight % |
| Pigment red 57:1 | 1.0 weight % |
| Bornitride | 70 weight % |
| Calcium stearate | 9 weight % |
| Stearate acid | 10 weight % |
| Cellulose derivate | 8.5 weight % |

Recipe Example 4—Purple Lead (Variation)

| | |
|---|---|
| Pigment purple 27 | 1.5 weight % |
| Pigment red 57:1 | 1.0 weight % |
| Bornitride | 50 weight % |
| Steatite | 10 weight % |
| Mica | 10 weight % |
| Calcium stearate | 9 weight % |
| Stearate acid | 10 weight % |
| Carboxymethyl cellulose | 8.5 weight % |

In the following, the production of a color lead will be described in an exemplary manner.

Essentially, the production takes place in four procedure steps, wherein, in a first step, the at least one chromophoric medium, the at least one binder material, the at least one lubricant and the filler material are mixed in a dry state into a solid matter mixture, and, in a second step, based on the mixture 10 to 20 weight % water and/or organic dissolvent are added to the solid matter mixture, and, in a third step, a granulate is formed, and, in a fourth step, the granulate is extruded.

No impregnation of the thus produced lead takes place.

While specific embodiments of the invention have been shown and described in detail to illustrate the inventive principles, it will be understood that the invention may be embodied otherwise without departing from such principles.

I claim:

1. An unburnt color lead for writing devices, drawing devices and painting devices, the color lead comprising at least one chromophoric agent, at least one binder, at least one organic lubricant which is solid at room temperature, and at least one filler material whose particles are mainly disk-shaped, wherein the color lead contains 30 to 80 weight % of the at least one filler material, and wherein the at least one filler material is hexagonal bornitride.

2. The color lead according to claim 1, wherein the lead contains as a second filler material at least one material selected from the group of layer silicates.

3. The color lead according to claim 2, wherein the layer silicates are selected from the group consisting of stearite, mica, talc, pyrophylite, muscovite and/or caolinite.

4. The color lead according to claim 1, wherein the binder is at least one of a water soluble cellulose derivate, starch and/or polyvinyl alcohol.

5. The color lead according to claim 1, wherein the lubricant comprises at least of a stearine acid and a stearate.

* * * * *